United States Patent
Hashimoto et al.

(10) Patent No.: US 9,077,207 B2
(45) Date of Patent: Jul. 7, 2015

(54) PARALLEL RUNNING CONTROL APPARATUS FOR INVERTER GENERATORS

(75) Inventors: Shoji Hashimoto, Wako (JP); Yoichi Yamamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 664 days.

(21) Appl. No.: 13/472,560

(22) Filed: May 16, 2012

(65) Prior Publication Data

US 2012/0293004 A1    Nov. 22, 2012

(30) Foreign Application Priority Data

May 17, 2011 (JP) ................................ 2011-110571

(51) Int. Cl.
| | |
|---|---|
| F02D 29/06 | (2006.01) |
| H02P 9/04 | (2006.01) |
| H02J 3/40 | (2006.01) |
| H02P 25/22 | (2006.01) |
| H02P 9/02 | (2006.01) |
| H02P 9/00 | (2006.01) |

(52) U.S. Cl.
CPC . *H02J 3/40* (2013.01); *H02P 25/22* (2013.01); *H02P 9/02* (2013.01)

(58) Field of Classification Search
USPC ............... 290/40 B; 318/400; 322/94; 363/37
See application file for complete search history.

(56) References Cited

U.S. PATENT DOCUMENTS

| | | | | |
|---|---|---|---|---|
| 3,908,130 | A * | 9/1975 | Lafuze ............................. | 290/46 |
| 4,490,666 | A * | 12/1984 | Tanamachi et al. ........... | 318/800 |
| 4,631,459 | A * | 12/1986 | Fujioka et al. ............ | 318/400.11 |
| 4,712,050 | A * | 12/1987 | Nagasawa et al. ........ | 318/400.04 |
| 4,839,575 | A * | 6/1989 | MacFarlane .................... | 322/25 |
| 4,937,508 | A * | 6/1990 | Rozman ................... | 318/400.03 |
| 8,547,041 | B2 * | 10/2013 | Furukawa et al. ........ | 318/400.02 |
| 8,638,003 | B2 * | 1/2014 | Hashimoto et al. ............. | 290/27 |
| 8,766,603 | B2 * | 7/2014 | Hashimoto ..................... | 322/89 |
| 8,810,189 | B2 * | 8/2014 | Singh et al. .................... | 318/801 |
| 2009/0284194 | A1* | 11/2009 | Forte ........................ | 318/400.02 |
| 2012/0291739 | A1* | 11/2012 | Hashimoto et al. ........ | 123/179.3 |
| 2012/0293140 | A1* | 11/2012 | Hashimoto ..................... | 322/94 |
| 2012/0294049 | A1* | 11/2012 | Hashimoto et al. ............. | 363/37 |
| 2012/0294050 | A1* | 11/2012 | Hashimoto et al. ............. | 363/37 |

FOREIGN PATENT DOCUMENTS

JP    2996542    1/2000

* cited by examiner

*Primary Examiner* — Pedro J Cuevas
(74) *Attorney, Agent, or Firm* — Rankin, Hill & Clark LLP

(57) ABSTRACT

In a parallel running control apparatus for inverter generator A having first, second and third inverters adapted convert alternating current outputted from windings wound around an alternator into direct/alternating current by driving switching elements, and CPUs to control turning ON/OFF of the switching elements, it is configured so that the generator A runs in parallel with at least one inverter generator B, which is configured to be same as the inverter generator A, to output a three-phase alternating current, and one of the CPU determines that the generator B was stopped when at least one of phase differences between a phase of an output from the first inverter and phases of outputs from the second and third inverters becomes greater than or equal to a predetermined value.

10 Claims, 14 Drawing Sheets

GENERATING SQUARE WAVE SHIFTED BY 120 AND 240 DEGREE

ALWAYS GENERATING SYNCHRONIZED SIGNAL CORRESPONDING TO INCREASING AND DECREASING FREQUENCY OF REFERENCE SIGNAL

MASTER GENERATOR

SLAVE GENERATOR

FIG. 16A  MASTER GENERATOR  STOPPED BY ANY REASON
UNABLE TO DETECT PHASE RELATION
FIG. 16B  SLAVE GENERATOR
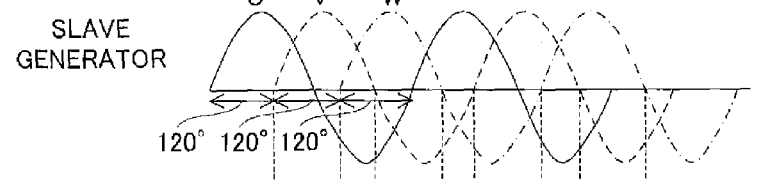
120° 120° 120°
AS A RESULT
FIG. 16C  SLAVE GENERATOR
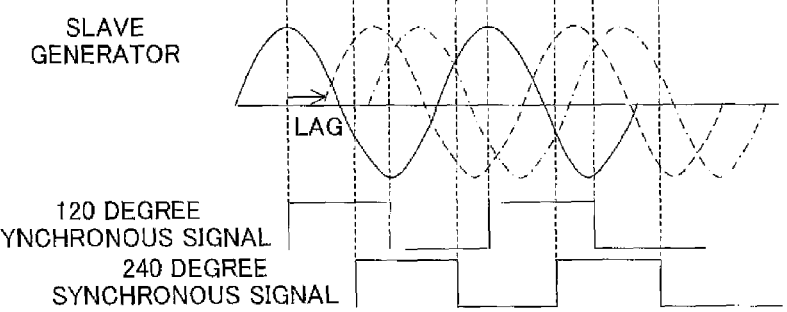
LAG
120 DEGREE SYNCHRONOUS SIGNAL
240 DEGREE SYNCHRONOUS SIGNAL

PARALLEL RUNNING CONTROL APPARATUS FOR INVERTER GENERATORS

BACKGROUND OF THE INVENTION

1. Technical Field

Embodiments of the invention relate to a parallel running control apparatus for inverter generators, particularly to a control apparatus that can run inverter generators outputting a three-phase alternating current in parallel

2. Background Art

Conventionally, there is a well-known technique for a parallel running control apparatus for inverter generators, as taught, for example, by Japanese Patent No. 2996542. In the reference, a phase and a voltage amplitude of a single-phase two-wire inverter generator are synchronized with the those of other single-phase two-wire inverter generators, such that the generators are run in parallel.

SUMMARY

Thus the reference discloses running single-phase two-wire inverter generators in parallel by synchronizing their phase and voltage amplitude. However, for three-phase alternating current inverter generators, since it is required to synchronize each phase and each voltage amplitude of a three-phase alternating current of one generator with those of other generator, it is difficult to run three-phase alternating current inverter generators in parallel from the teaching of the reference.

Further, in case of a parallel running control for single-phase two-wire inverter generators, if one of the generators is stopped during the parallel running operation, since the output from the generator is single-phase, it does not cause a phase fluctuation that adversely influences upon a load. However, in a parallel running control apparatus for three-phase inverter generators, since each phase of the power outputs from the generators to be supplied to a load is offset by 120 degrees, if a reference generator is stopped during the parallel running operation, it disadvantageously increases the probability to cause a phase fluctuation of the power output. As a result, a power factor of the load, e.g., a three-phase motor, decreases and the motor becomes unable to generate a normal rotating magnetic field and therefore, unable to operate the load sufficiently. If this happens, the other generator needs to be stopped.

An object of embodiments of this invention is therefore to overcome the foregoing problem by providing a parallel running control apparatus for inverter generators that can run a plurality of three-phase alternating current inverter generators in parallel, while immediately determining whether a reference generator was stopped by any disturbance so as to prevent the load from suffering an adverse influence therefrom.

In order to achieve the object, the embodiments provide in its first aspect a parallel running control apparatus for an inverter generator A having first, second and third windings wound around an alternator driven by an engine, first, second and third inverters each connected to the first, second and third windings to convert alternating current outputted from the first, second and third windings into direct and alternating current through switching elements to output the converted alternating current, first, second and third controllers each adapted to control turning ON/OFF of the switching elements of the corresponding first, second and third inverters and connected to enable to be communicated with each other, and an output terminal connected to terminal groups connected to the first, second and third inverters to output the converted alternating current as one of a U-phase, V-phase, and W-phase outputs and connected to a neutral terminal of the terminal groups; wherein the improvement comprises the inverter generator A is adapted to run in parallel with at least one inverter generator B, which is configured to be same as the inverter generator A, to output a three-phase alternating current, each of the first, second and third controllers has a voltage/phase detector that detects voltage and phase of the converted alternating current inputted into the corresponding first, second and third inverters from the generator B, and when U-phase, V-phase and W-phase terminals of the output terminal are connected to the corresponding U-phase, V-phase and W-phase terminals of the generator B via a connection cable, controls turning ON/OFF of the switching elements of the first, second and third inverters such that the outputs from the first, second and third inverters are synchronized with the detected voltage and phase, and the first controller determines that the generator B was stopped when at least one of phase differences between the converted alternating current output from the first inverter and the converted alternating current output from the second and third inverters becomes greater than or equal to a predetermined value.

In order to achieve the object, the embodiments provide in its second aspect a method for controlling a parallel running operation for inverter generator A having first, second and third windings wound around an alternator driven by an engine, first, second and third inverters each connected to the first, second and third windings to convert alternating current outputted from the first, second and third windings into direct and alternating current through switching elements to output the converted alternating current, first, second and third controllers each adapted to control turning ON/OFF of the switching elements of the corresponding first, second and third inverters and connected to enable to be communicated with each other, an output terminal connected to terminal groups connected to the first, second and third inverters to output the converted alternating current as one of a U-phase, V-phase, and W-phase outputs and connected to a neutral terminal of the terminal groups, and a voltage/phase detector that detects voltage and phase of the converted alternating currents inputted into the first, second and third inverters from a generator B, which is configured to be same as the generator A, and adapted to run in parallel with the generator B, to output a three-phase alternating current; wherein the improvement comprises the steps of controlling turning ON/OFF of the switching elements of the first, second and third inverters such that the outputs from the first, second and third inverters are synchronized with the detected voltage and phase when U-phase, V-phase and W-phase terminals of the output terminal are connected to the corresponding U-phase, V-phase and W-phase terminals of the generator B via a connection cable, and determining that the generator B was stopped when at least one of phase difference between the converted alternating current output from the first inverter and the converted alternating current output from the second and third inverters becomes greater than or equal to a predetermined value.

BRIEF DESCRIPTION OF DRAWINGS

The above and other objects and advantages will be more apparent from the following description and drawings in which:

FIGS. 16A-16C are time charts similar to FIGS. 15A-15B, but showing output waveforms of the generators A and B for explaining processing of FIG. 14 during the parallel running operation of the two inverter generators shown in FIG. 12;

DESCRIPTION OF EMBODIMENTS

A parallel running control apparatus for inverter generators according to embodiments of the present invention will now be explained with reference to the attached drawings.

Figure 1:
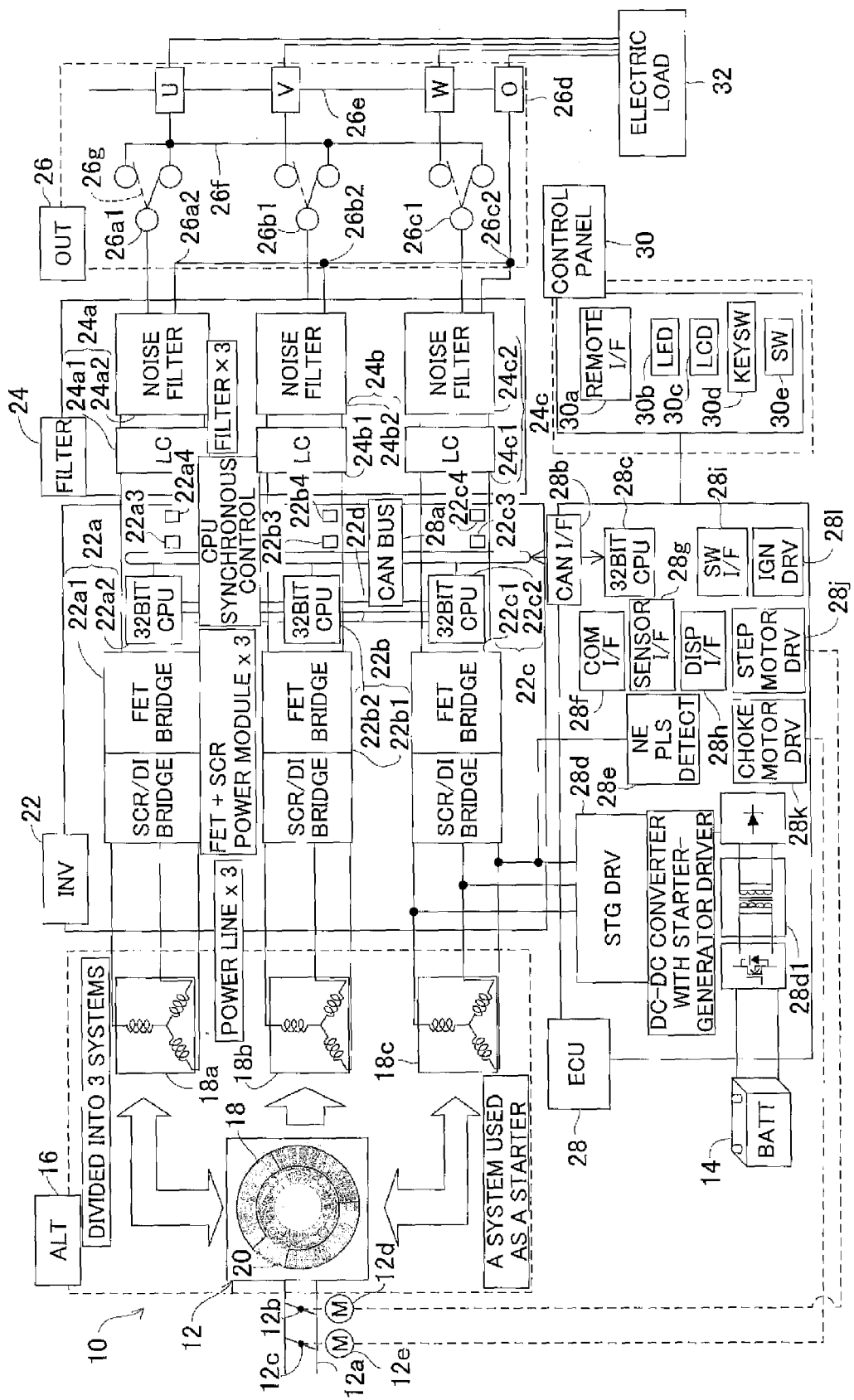
FIG. 1 is a block diagram showing a parallel running control apparatus for an inverter generator according to a first embodiment of the invention.

FIG. 1 is an overall block diagram showing a parallel running control apparatus for inverter generators according to a first embodiment of the invention.

In FIG. 1, symbol 10 designates an inverter generator. The generator 10 is equipped with an internal combustion engine 12 and has a rated output of about 5 kW (AC (alternating current) 100V, 50 A). The engine 12 is an air-cooled, spark-ignition gasoline engine.

A throttle valve 12b and choke valve 12c are installed in an air intake pipe 12a of the engine 12. The throttle valve 12b is connected to a throttle motor (composed of a stepper motor) 12d, and the choke valve 12c is connected to a choke motor (also composed of a stepper motor) 12e.

The engine 12 is equipped with a battery 14 whose rated output is about 12V. When power is supplied from the battery 14, the throttle motor 12d and choke motor 12e respectively drive the throttle valve 12b and choke valve 12c to open and close. The engine 12 has an alternator section (shown as "ALT") 16.

Figure 2:
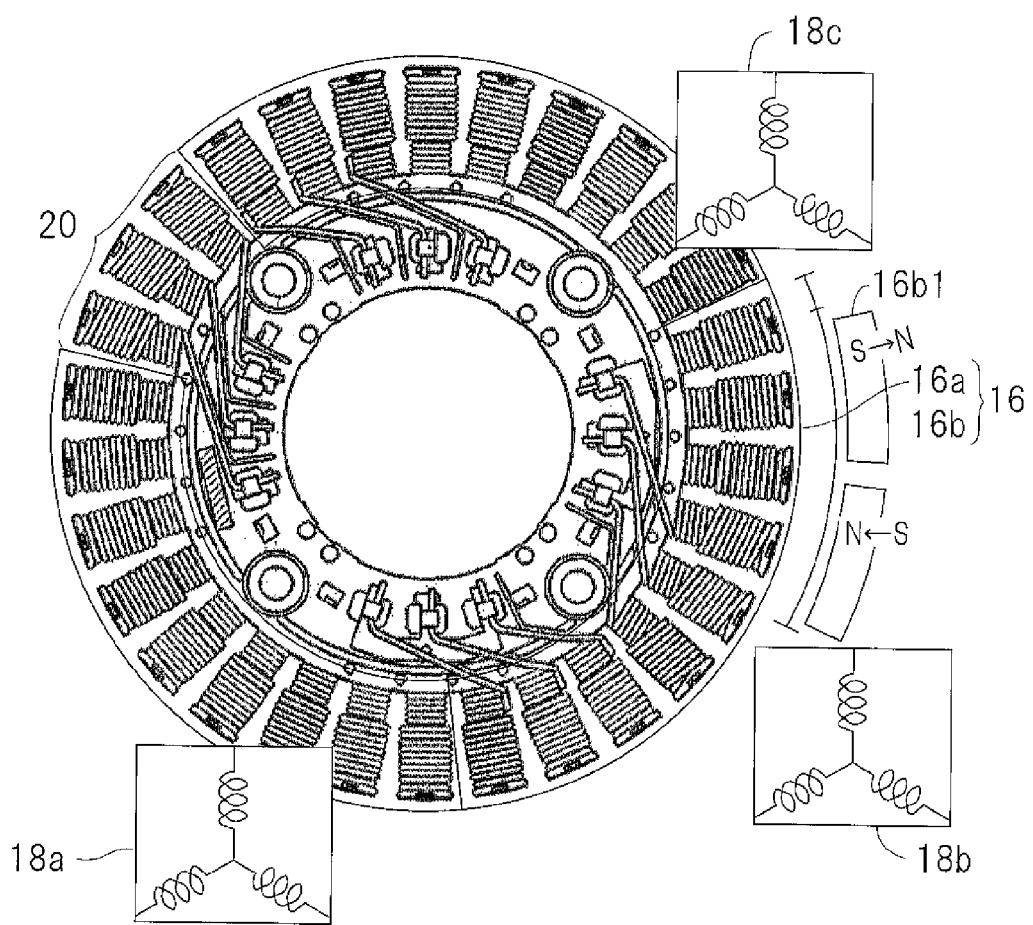
FIG. 2 is a plan view showing a crank case of an engine of the inverter generator shown in FIG. 1.

FIG. 2 is a plan view of a crank case 12f of the engine 12 shown in FIG. 1, where the alternator section 16 is provided.

As shown in FIG. 2, the alternator section 16 includes a stator 16a mounted on the crank case 12f of the engine 12, and a rotor 16b which is rotatably installed around the stator 16a and also functions as a flywheel of the engine 12.

The stator 16a comprises thirty teeth. Twenty-seven teeth of them are wound by three-phase output windings (main windings) 18 comprising of three sets of U, V and W-phase windings, and the other three teeth of them are also wound by one three-phase output winding (sub winding) 20 comprising one set of the U, V, and W-phase windings. The main windings 18 comprise windings 18a, 18b and 18c.

Multiple pairs of permanent magnet pieces 16b1 are embedded or attached inside the rotor 16b installed on the outer side of the stator 16a with radially oriented polarity reversed alternately to face the output windings 18, 20. In the alternator section 16, when the permanent magnet pieces 16b1 of the rotor 16b are rotated around the stator 16a, AC power of the U, V, and W-phase is outputted (generated) from the three-phase output windings 18 (more specifically, 18a, 18b, 18c) and the AC power of each phase is also outputted from the sub winding 20.

The explanation of FIG. 1 will be resumed. The generator 10 according to this embodiment has, in addition to the alternator section (ALT) 16 where the output windings 18 are wound, an inverter section (shown as "INV") 22, a filter section (shown as "FILTER") 24, an output section (shown as "OUT") 26, an engine control section (shown as "ECU") 28, and an engine control panel section (shown as "CONTROL PANEL") 30. The ECU (Electronic Control Unit) functions as an electronic control section and has a CPU as explained later.

As illustrated, the characteristic feature of the generator 10 according to this embodiment is that three sets (three) of single-phase inverter generators (inverters) are connected in parallel so that they can output a three-phase AC of a desired voltage in a desired phase or a single-phase AC of a desired voltage selectively and reliably.

Specifically, the generator 10 has three sets of windings 18 composed of first, second and third windings 18a, 18b, 18c, the inverter section 22 comprising three sets of the inverters composed of first, second and third inverters (inverter generators) 22a, 22b, 22c, the filter section 24 comprising three sets of filters composed of first, second and third filters 24a, 24b, 24c, the output section 26 comprising a three-phase output terminal 26e and a single-phase output terminal 26f, the engine control section 28 that controls an operation of the engine 12, and the control panel section 30.

The inverter section 22 and other sections are provided with, for example, semiconductor chips installed on a printed circuit board accommodated in a case located at an appropriate position of the engine 12. The control panel section 30 is also provided with semiconductor chips similarly installed at an appropriate position of the engine 12 and a panel connected thereto.

The output windings 18, the inverter section 22, the filter section 24 and the output section 26 (each comprising three sets labeled with letters a, b or c) are configured to be connected with the part of the same letter to each other correspondently.

The first, second and third inverters 22a, 22b, 22c constituting the inverter section 22 comprise single-phase two-wire inverters that have power modules 22a1, 22b1, 22c1 composed of FETs (Field Effect Transistors) and SCRs (thyristors) integrally connected thereto, 32-bit CPUs 22a2 (first controller), 22b2 (second controller), 22c2 (third controller), and interphase voltage/current sensors 22a3, 22b3, 22c3 for detecting voltage and current between phases of a power output. The CPUs 22a2, 22b2, 22c2 are connected via a communication path 22d with each other to be able to communicate therewith.

Figure 3:
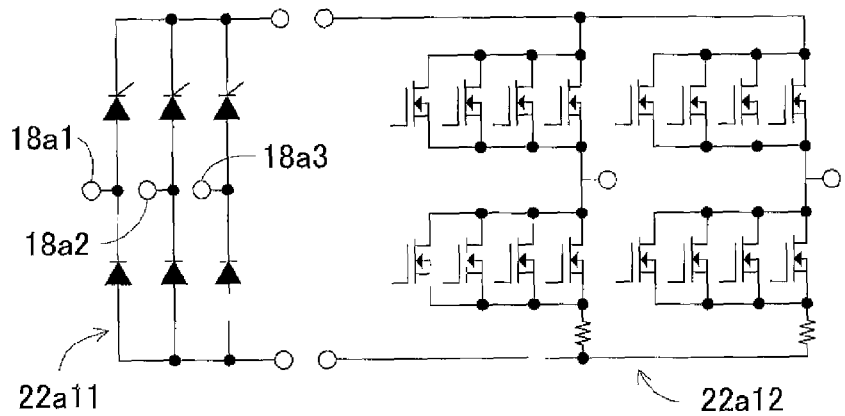
FIG. 3 is a circuit diagram showing a detailed configuration of an inverter section of the inverter generator shown in FIG. 1.

FIG. 3 is a circuit diagram showing a configuration of the inverter section 22 in detail. Although the following explanation will be made for the set a, the explanation can also be applied to the sets b and c, since their configurations are basically the same with each other.

As illustrated in FIG. 3, the power module 22a1 comprises a hybrid bridge circuit 22a11 in which three SCRs (Thyristors used as switching elements for direct current (DC) conversion) and three DIs (Diodes) are bridge-connected, and an H bridge circuit 22a12 in which four FETs are bridge-connected.

Three-phase AC power outputted (generated) from the U-phase winding 18a of the output windings 18 wound around the alternator section 16 is inputted to the first inverter 22a associated therewith and then inputted to a mid-point between the SCR and DI in the hybrid bridge circuit 22a11 of the power module 22a1.

A gate of the SCR in the hybrid bridge circuit 22a11 is connected to the battery 14 via a driver circuit (not shown). The CPU 22a2 controls current supply (ON; conducted) or termination of the current supply (OFF; not conducted) to the gate of the SCR from the battery 14 through the driver circuit.

Specifically, based on the output of the interphase voltage/current sensor 22a3, the CPU 22a2 turns ON (conducts) the gate of the SCR at a turn-on angle (angle of conduction) corresponding to a desired output voltage, such that the AC inputted to the power module 22a1 from the output winding 18a is converted into DC at the desired output voltage.

The DC outputted from the hybrid bridge circuit 22a11 is inputted to the FETs-H bridged circuit 22a12 where the FETs are connected to the battery 14. The CPU 22a2 controls current supply (ON; conducted) to the FETs or termination of current supply (OFF; not conducted), the inputted DC is inverted into AC in a desired frequency (e.g., a commercial frequency of 50 Hz or 60 Hz).

Figure 4:
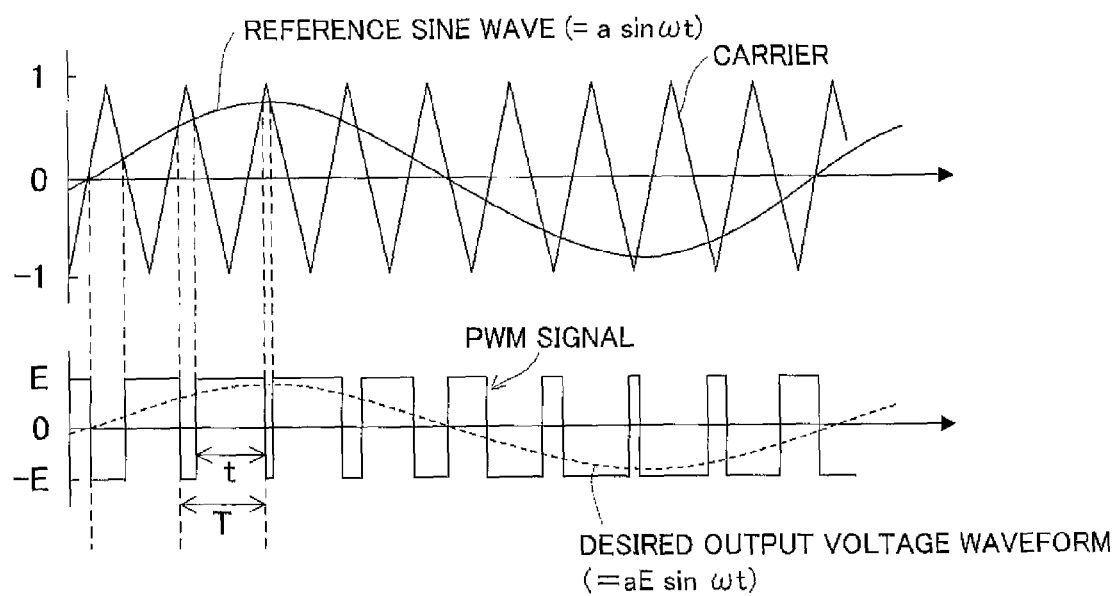
FIG. 4 is an explanatory view explaining an operation of the inverter section of the inverter generator shown in FIG. 1.

FIG. 4 is an explanatory view explaining an operation of the H bridge circuit 22a12.

As illustrated, the CPU 22a2 generates a reference sine wave (signal wave; shown by an upper solid-line wave) in a predetermined frequency (i.e., 50 Hz or 60 Hz commercial frequency) of the desired output voltage (in waveform), and compares the generated reference sine wave with a carrier (e.g., a 20 kHz carrier wave) using a comparator (not shown) so as to produce a PWM (Pulse Width Modulation) signal, and turns ON/OFF the FETs in the H bridge circuit 22a12 in accordance with the produced PWM signal.

The lower broken-line wave shown in FIG. 4 indicates the desired output voltage (in waveform). It should be noted that the period T (step) of the PWM signal (PWM waveform) is actually much shorter than shown, but is enlarged in FIG. 4 for ease of understanding.

Again returning to the explanation of FIG. 1, the inverter section 22 is connected to the filter section 24.

The filter section 24 comprises LC filters (low pass filters) 24a1, 24b1, 24c1 that remove a higher harmonic wave and noise filters 24a2, 24b2, 24c2 that remove a noise. The AC output inverted in the inverter section 24 is inputted to the LC filters 24a1, 24b1, 24c1 and noise filters 24a2, 24b2, 24c2 to remove a higher harmonic wave and noise.

Figure 5:
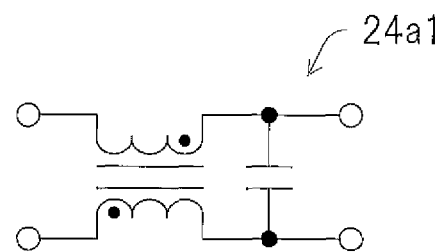
FIG. 5 is a circuit diagram showing a detailed configuration of a filter section of the inverter generator shown in FIG. 1.
Figure 6:
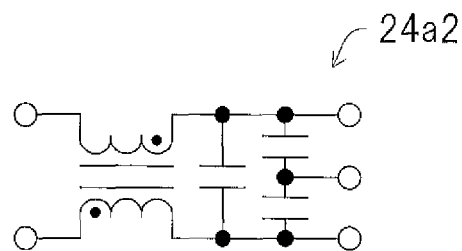
FIG. 6 is a circuit diagram similar to FIG. 5, but showing another detailed configuration of the filter section of the inverter generator shown in FIG. 1.

FIG. 5 shows a circuit configuration of the LC filter 24a1, and FIG. 6 shows a circuit configuration of the noise filter 24a2. Although not shown, circuit configurations of the LC filters 24b1, 24c1 and noise filters 24b2, 24c2 are the same.

In FIG. 1, the inverter section 22 is connected to the output section 26 via the filter section 24.

As shown in the figure, the output section 26 comprises a three-phase (four-wire) output terminal (output terminal) 26e and a single-phase (two-wire) output terminal 26f. The three-phase output terminal 26e is connected to terminal groups 26a, 26b, 26c which are connected to the first, second and third inverters 22a, 22b, 22c respectively and output one AC in a phase from among U, V, W-phases respectively, and is connected to a neutral terminal 26d of the terminal groups in series. The single-phase output terminal (output terminal) 26f is connected to the terminal groups in parallel and to the neutral terminal in series.

To be more specific, the three-phase (four-wire) output terminal 26e is respectively series-connected to a U-phase terminal 26a1 which is connected to the first inverter 22a and outputs a U-phase AC, to a V-phase terminal 26b1 which is connected to the second inverter 22b and outputs a V-phase AC, to a W-phase terminal 26c1 which is connected to the third inverter 22c and outputs a W-phase AC, and to the neutral O-phase terminal 26d which connects neutral points of the first, second and third inverters 22a, 22b, 22c.

Further, the output section 26 has the single-phase (two-wire) output terminal 26f which is parallel-connected to the U-phase terminal 26a1, to the V-phase terminal 26b1 and to the W-phase terminal 26c1, and is series-connected to the O-phase terminal 26d, and has a switching mechanism 26g that switches the three-phase output terminal 26e and the single-phase output terminal 26f.

The three-phase output terminal 26e and single-phase output terminal 26f are connected to an electric load 32 via a connector (not shown) and the like.

The engine control section 28 has a 32-bit CPU 28c and controls operation of the engine 12. The engine control section 28 is connected to the CPUs 22a2, 22b2, 22c2 (first, second and third controllers) of the inverters 22a, 22b, 22c via a CAN (Control Area Network) BUS 28a and a CAN I/F (Interface) 28b so that it can communicate with the CPUs 22a2, 22b2, 22c2. The output from the aforementioned output winding (sub winding) 20 is supplied to the CPU 22a2, 22b2, 22c2, 28c as their operating power.

The engine control section 28 has a starter-generator driver (STG DRV) 28d which operates the output winding 18c, in addition to the generator, as a starting device (starter) of the engine 12. Specifically, in this embodiment, one of the output windings 18a, 18b, 18c (e.g., output winding 18c) is configured to operate as an engine starter with the aid of the starter-generator driver 28d, in other words the alternator section 16 is configured to operate as a prime mover.

The starter-generator driver 28d comprises a DC-DC converter 28d1. As described later, the DC-DC converter 28d1 boosts the output (raises its voltage) of the battery 14 to about 200V and supplies the boosted battery output to the output winding 18c in response to a command from the CPU 28c so that the rotor 16b of the alternator section 16 is rotated relative to the stator 16a to start the engine 12.

The engine control section 28 further includes a TDC (Top Dead Center) circuit (not shown) to detect pulses outputted from a pulsar (not shown) made of a magnetic pickup installed at location close to the stator 16a or rotor 16b, and an engine speed detection circuit 28e that is connected to a U-phase terminal of the output winding 18c to detect an engine speed based on the output thereof.

The engine control section 28 further includes a communication (COM) I/F 28f, a sensor (SENSOR) I/F 28g, a display (DISP) I/F 28h, a switching (SW) I/F 28i, a drive circuit 28j that drives the throttle motor 12d, a drive circuit 28k that drives the choke motor 12e, and an ignition drive circuit 28l that drives an ignition device (not shown).

The aforementioned 32-bit CPU 28c determines an opening of the throttle valve 12b in such a manner that the engine speed converges at a desired engine speed calculated in accordance with required AC output to be supplied to the electric load 32, and supplies current (power) to the throttle motor 12d through the drive circuit 28j to control its operation.

The control panel section 30 has a remote (REMOTE) I/F 30a which is connected wirelessly (or in wired) to a remote control box 40 provided separately from the engine 12 and adapted to be carried by a user, an LED (Light Emitting Diode) 30b, an LCD (Liquid Crystal Display) 30c, a KEY switch (main switch) 30d which is adapted to be manipulated by the user and to send a command to operate (start) and stop the generator 10, and a three-phase/single-phase selector switch 30e which is adapted to send a command to switch the output from the generator 10 between the three-phase AC and single-phase AC.

The control panel section 30 and the engine control section 28 are connected wirelessly (or in wired) to communicate with each other. The outputs of the KEY switch 30d and selector switch 30e of the control panel section 30 are inputted to the engine control section 28 through the switching I/F 28i, and the engine control section 28 controls to flush the LED 30b and LCD 30c of the control panel section 30 through the display I/F 28h.

Figure 7:
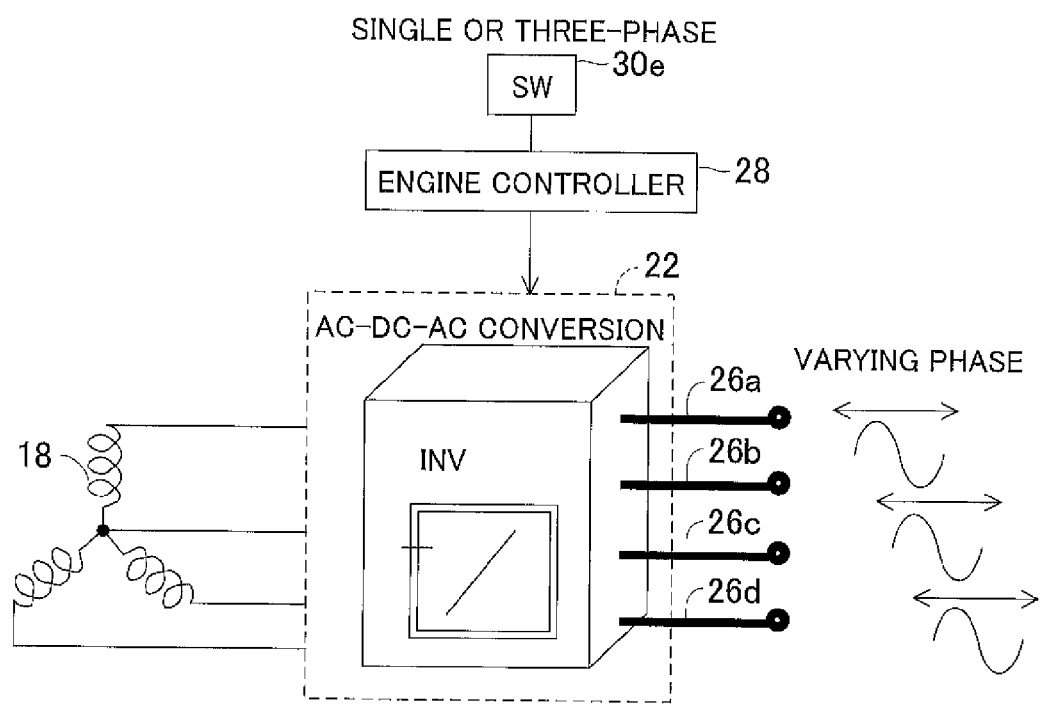
FIG. 7 is an explanatory view showing an operation of an engine control section of the inverter generator shown in FIG. 1.

FIG. 7 is an explanatory view showing an operation of the engine control section 28.

As described above, since the generator 10 of this embodiment is intended to selectively and reliably output the three-phase AC and single-phase AC at a desired voltage in a desired phase, the inverter section 22 is configured to have three sets of the single-phase inverters (first, second and third inverters) 22a, 22b, 22c, and the CPU 28c of the engine control section 28 is configured to operate the switching mechanism 26g of the output section 26 to switch the three-phase output terminal and the single-phase output terminal in response to the output of the selector switch 30e.

In the inverter section 22, one of the single-phase inverters 22a, 22b, 22c, e.g., the inverter 22a, is designated as a master inverter and the others as slave inverters. When the three-phase AC is to be outputted from the generator 10 along with the communication with the CPU 28c of the engine control section 28, as shown in FIG. 8, the CPUs 22a2, 22b2, 22c2 of the three sets of the single-phase inverters 22a, 22b, 22c control the operation of the inverter section 22, making the output phase from the U-phase output terminal 26a of the master inverter 22a as a reference, such that the output phases from the V-phase output terminal 26b and W-phase output terminal 26c of the slave inverters 22b, 22c are offset or delayed from that from the U-phase output terminal 26a by 120 degrees.

On the other hand, when the single-phase AC is outputted along with the communication with the CPU 28c, the CPUs 22a2, 22b2, 22c2 control the operation of the inverter section 22 to synchronize the outputs from the V-phase output terminal 26b and W-phase output terminal 26c of the slave inverters 22b, 22c in phase, making the output from the U-phase terminal 26a of the master inverter 22a as the reference, such that the single-phase AC is outputted from the single-phase output terminal 26f.

Figure 8:
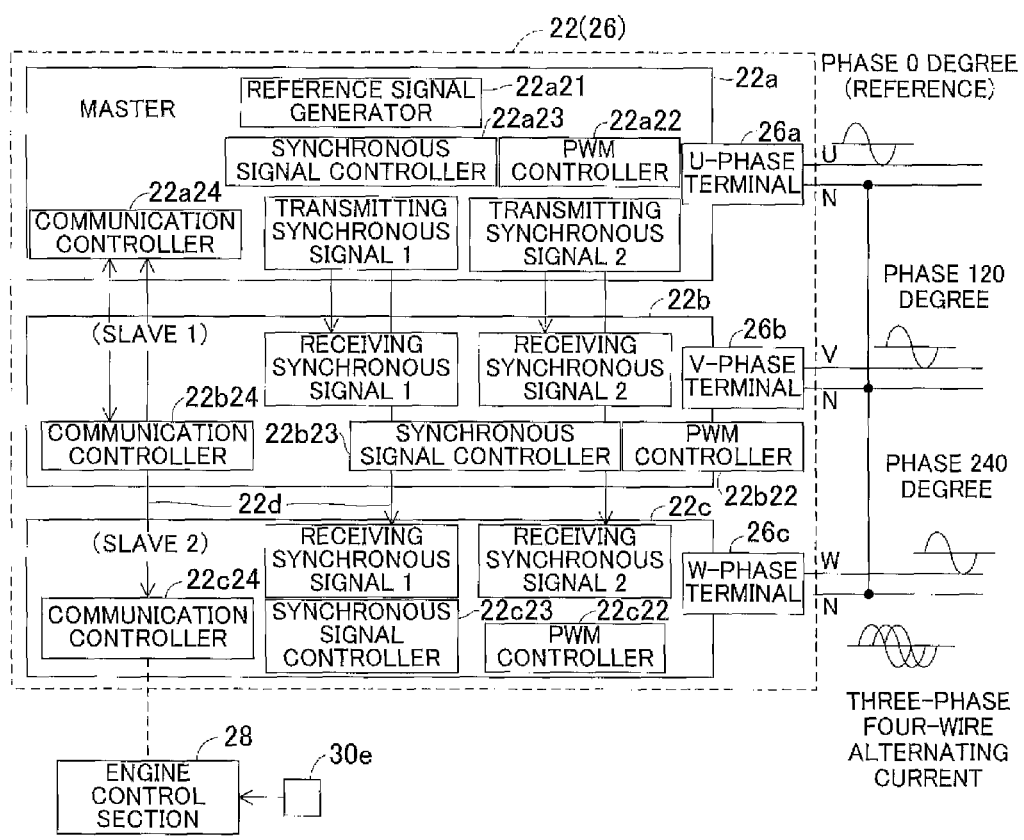
FIG. 8 is a block diagram specifically showing an operation of a controller of the inverter section of the inverter generator shown in FIG. 1.
Figure 9A:
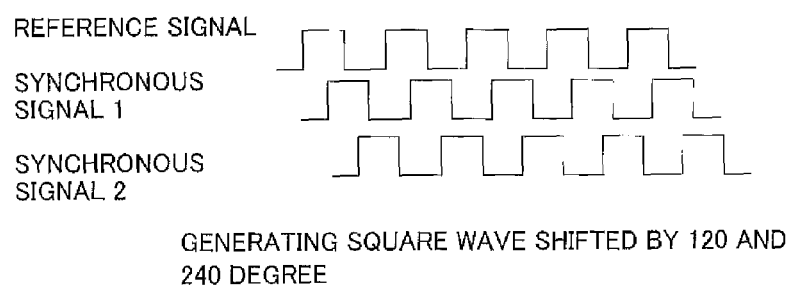
FIGS. 9A-9B are time charts explaining a reference signal and synchronous signals used in the configuration shown in FIG. 8.
Figure 9B:
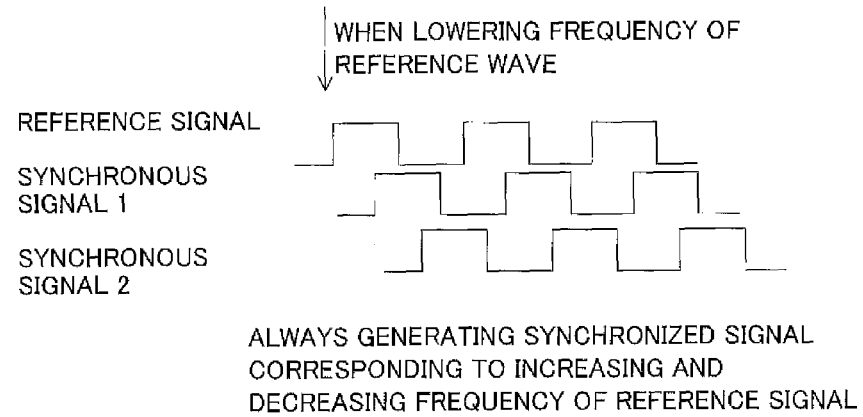

FIG. 8 is a block diagram showing an operation of the CPUs 22a2, 22b2, 22c2, specifically, an operation of an autonomous running control of the generator, FIGS. 9A-9B are time charts explaining a reference signal and synchronous signals used in the operation of FIG. 8.

As illustrated, the CPU 22a2 of the first (master) inverter 22a has a reference signal generator 22a21 which generates the reference signal (shown in FIGS. 9A-9B) of the predetermined frequency, a PWM controller 22a22 which conducts a PWM control in response to the PWM signals described in FIG. 4, a synchronous signal controller 22a23 which generates synchronous signals 1, 2 (having a predetermined phase difference from the reference signal; shown in FIGS. 9A-9B) that are used to synchronize the output phases of the slave inverters 22b, 22c with the output phase of the master inverter 22a and transmits them to the CPU 22b2, 22c2, and a communication controller 22a24 which controls transmitting and receiving (communication of) the generated synchronous signals through the communication path 22d.

The second and third slave inverters 22b, 22c also have, except for the reference signal generator, PWM controllers 22b22, 22c22, synchronous signal controllers 22b23, 22c23 and communication controllers 22b24, 22c24 which are basically same as those of the master inverter 22a.

The CPU 22a2 of the first (master) inverter 22a, more specifically its synchronous signal controller 22a23 generates the synchronous signals 1, 2 offset by 120 degrees from the reference signal (in other words, the signals that have predetermined phase differences from the reference signal) and transmits them to the CPUs 22b2, 22c2, if the command to output (switch to) the three-phase AC is sent through the selector switch 30e. This will be same when the frequency of the reference signal is a predetermined frequency (FIG. 9A) or lower than the predetermined frequency (FIG. 9B).

Further, the CPU 22a2 of the first (master) inverter 22a communicates with the CPU 22b2, 22c2 and controls the operation of the inverter section 22 to synchronize the V-phase and W-phase outputs from the output terminals 26b, 26c with the output phase of the U-phase output terminal 26a, when the single-phase AC is to be outputted along with the communication with the CPU 28c, such that the single-phase AC is outputted from the single-phase output terminal 26f.

Specifically, the CPU 22a2 generates the reference signal of the predetermined frequency and the synchronous signals that have a predetermined phase difference (i.e., the same phase) from the reference signal, sends them to the CPUs 22b2, 22c2, and controls the operation of the inverter section 22 to synchronize the V-phase and W-phase outputs from the output terminals 26b, 26c with the output phase (reference) of the U-phase output terminal 26a, such that the single-phase AC is outputted from the single-phase output terminal 26f.

Figure 10:
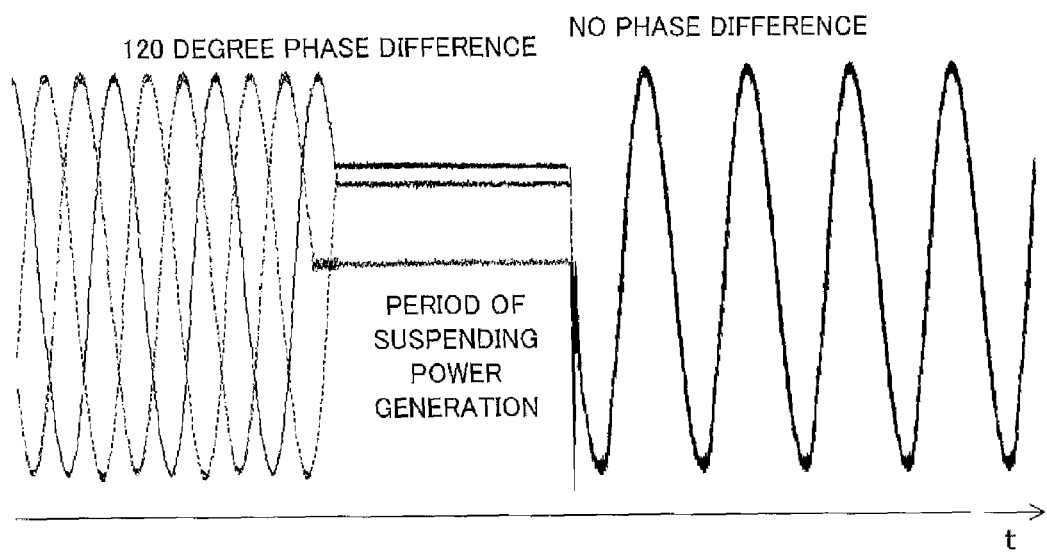
FIG. 10 is a time chart showing waveforms when an output is switched from a three-phase output to a single-phase output in response to the operation shown in FIG. 7.
Figure 11:
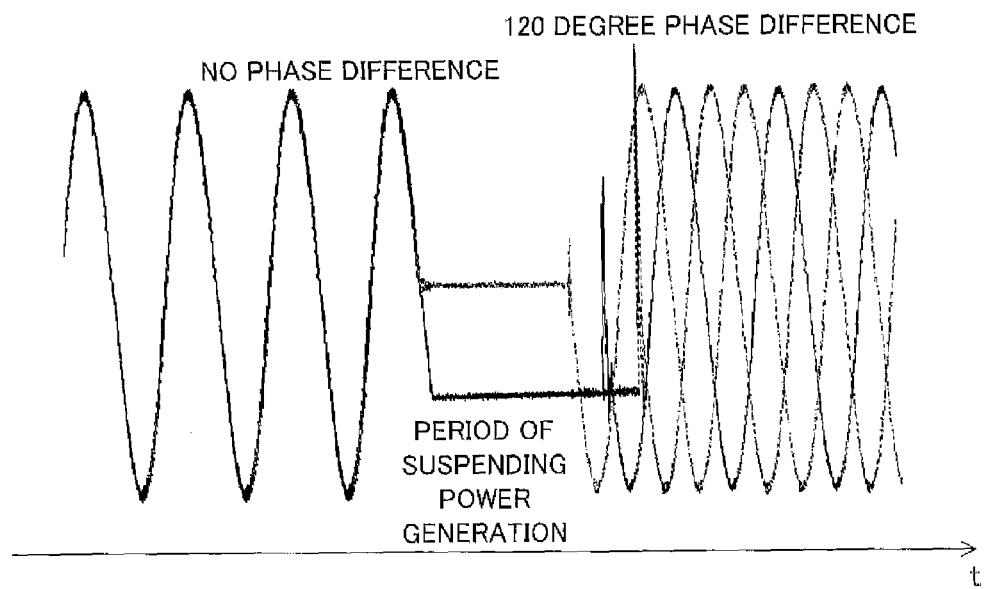
FIG. 11 is a time chart showing waveforms when an output is switched from a single-phase output to a three-phase output in response to the operation shown in FIG. 7.

FIG. 10 is a time chart showing waveforms in a case where the output is switched from the three-phase output to the single-phase output, and FIG. 11 is a time chart showing waveforms in the opposite case. As shown in FIGS. 10 and 11, the three-phase output and single-phase output of the desired voltage are selectively outputted from the generator 10 in response to the manipulation of the selector switch 30e of the control panel section 30 by the user.

The characterized aspect of this embodiment of the invention is to provide a parallel running control apparatus for inverter generators that can run a plurality of the aforementioned inverter generators 10 in parallel, which will now be explained.

Figure 12:
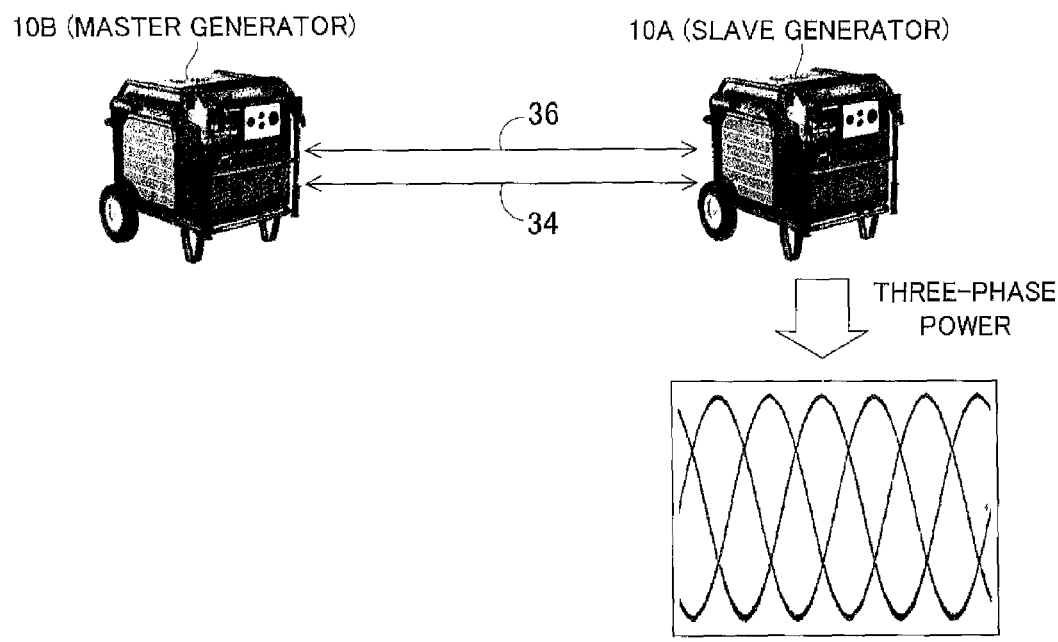
FIG. 12 is a perspective view of the inverter generators when running two inverter generators shown in FIG. 1 in parallel.
Figure 13:
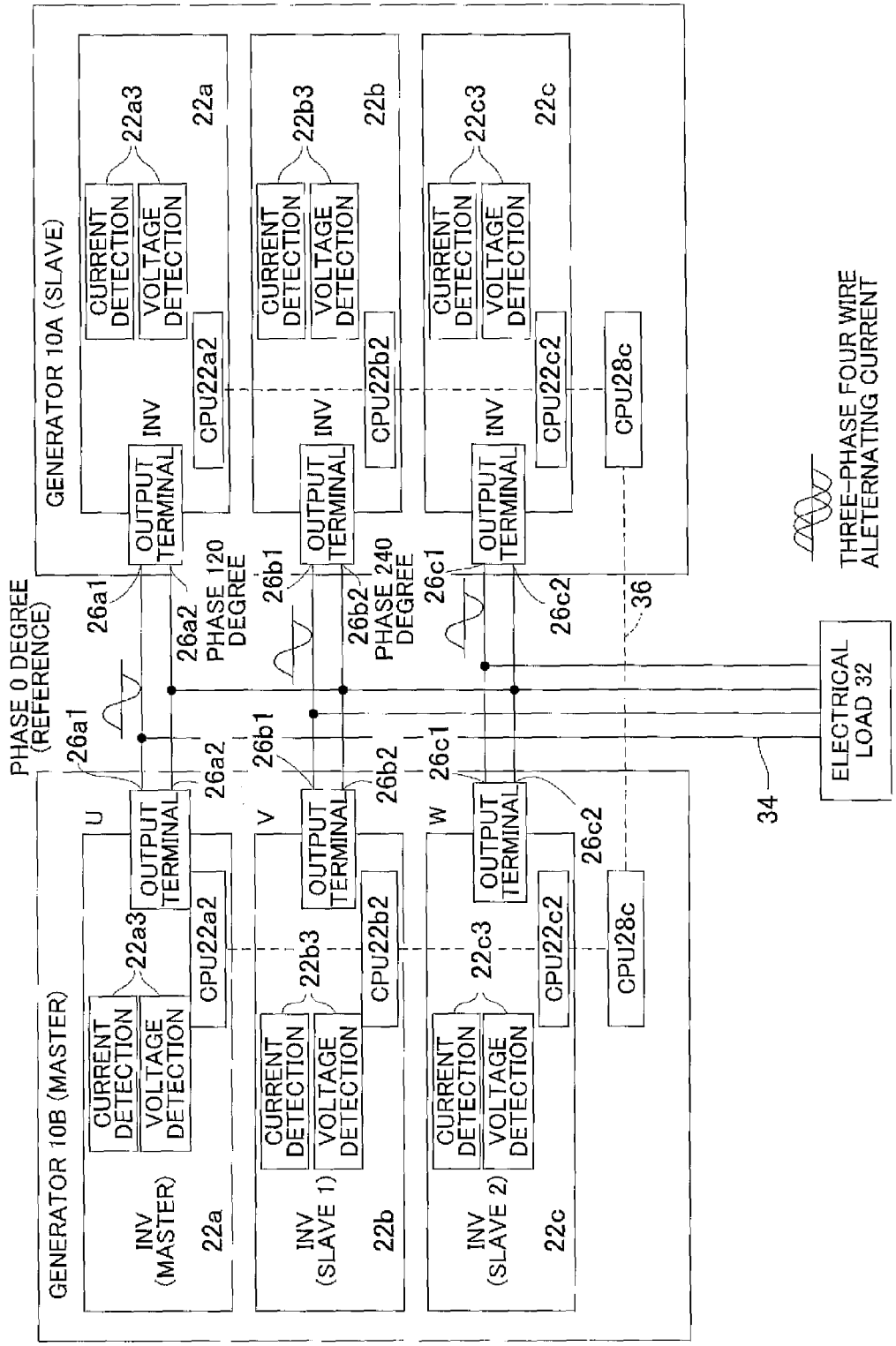
FIG. 13 is a block diagram when connecting the two inverter generators shown in FIG. 12 in parallel.

FIG. 12 is a perspective view of the inverter generators 10 (shown in FIG. 1), i.e., a plurality of, in specific, two inverter generators 10A, 10B to be run in parallel, and FIG. 13 is a block diagram showing an operation of the controllers of the inverter section 22 of the two generators 10A, 10B shown in FIG. 12. In this embodiment, the generator 10A is designated as a slave generator and the generator 10B as a master generator.

The generators 10A, 10B are connected to each other by a dedicated connection cable 34 and an external communication bus (CANBUS) 36. It is noted that the CPU 22a2 of the first inverter section 22 of the slave generator 10A functions as a parallel running control apparatus for the generators 10A, 10B in this embodiment.

As illustrated in FIG. 13, the U, V, W-phase terminals 26a1, 26b1, 26c1 and their neutral points 26a2, 26b2, 26c2 of the generator 10A are respectively connected to the corresponding U, V, W-phase terminals 26a1, 26b1, 26c1 and their neutral points 26a2, 26b2, 26c2 of the generator 10B via the connection cable 34. The output terminal (three-phase AC output terminal) 26e (shown in FIG. 1) comprises all the terminals of each of the generators 10A, 10B and is connected to the electric load 32 via the connection cable 34.

Specifically, in the generators 10A, 10B connected in parallel as illustrated, when the engine 12 of one of the generators, for instance, the slave generator 10A is started to generate power after the engine 12 of the master generator 10B is started to generate power, the U, V, W-phase AC each outputted from the inverters 22a, 22b, 22c of the generator 10B are detected by the corresponding interphase voltage/current sensors 22a3, 22b3, 22c3 of the generator 10A, and the CPUs 22a2, 22b2, 22c2 (first, second and third controllers) of the generator 10A separately control turning ON/OFF of the corresponding switching elements (SCRs in the hybrid bridge circuits 22a11, 22b11, 22c11 and FETs in the H bridge circuits 22a12, 22b12, 22c12) based on the detected voltage and current between phases so as to synchronize the each single-phase AC output from the corresponding inverters 22a, 22b, 22c of the generator 10A with the detected single-phase AC output from the corresponding inverters 22a, 22b, 22c of the generator 10B in terms of the voltage and phase, thereby running the generators 10A, 10B in parallel.

In other words, the CPUs 22a2, 22b2, 22c2 of the generator 10A detect zero-cross timings of the U, V, W-phase AC each outputted from the inverters 22a, 22b, 22c of the generator 10B based on the output of the interphase voltage/current sensors 22a3, 22b3, 22c3 of the generator 10A, and based on the detected zero-cross timings, separately control turning ON/OFF of the switching elements in the bridge circuits 22a12, 22b12, 22c12, etc., of the first, second and third inverters 22a, 22b, 22c, such that the U, V, W-phase AC each outputted from the corresponding first, second and third inverters 22a, 22b, 22c of own (the generator 10A) are synchronized with the outputs from the generator 10B.

Simultaneously, the master generator 10B operates the abovementioned self-sustained running control. Since the three-phase AC output from the generator 10B is controlled by the CPU 22a2 (first controller) of the generator 10B, each of the first, second and third controllers 22a2, 22b2, 22c2 of the slave generator 10A only needs to control the output from own first, second and third inverters 22a, 22b, 22c to be synchronized with the outputs from the corresponding each inverter of the generator 10B in terms of the voltage and phase. With this, the generators 10A, 10B can run in parallel with three-phase AC outputs.

The single-phase AC outputs of U, V, W-phases synchronized for each of the corresponding inverters 22 of the generators 10A, 10B are supplied to the electric load 32 from the three-phase AC output terminal 26e through the connection cable 34.

As illustrated, since the neutral points 26a2, 26b2, 26c2 of the generator 10A and the corresponding neutral points 26a2, 26b2, 26c2 of the generator 10B are connected to the electric load 32 via the connection cable 34, the generators 10A, 10B run in parallel function as a three-phase four-wire inverter generator and supply the generated power to the electric load 32.

Further, as illustrated, the generators 10A, 10B, more specifically the CPUs 22a2, 22b2, 22c2 of the generators 10A, 10B are connected with the CANBUS 36 to send and receive data regarding the generated voltage, current, and the like between the master generator 10B and the slave generator 10A during the parallel running operation. With this, when the output from one of the master generator 10B and the slave generator 10A is lower than the output from the other, the CPUs of the generator with lower output control turning ON/OFF of the FETs in the H bridge circuits 22a12, 22b12, 22c12 or the like to correct magnitudes of amplitude and phase offsets of voltage to reduce an unbalanced current, a cross current and the like.

Figure 14:
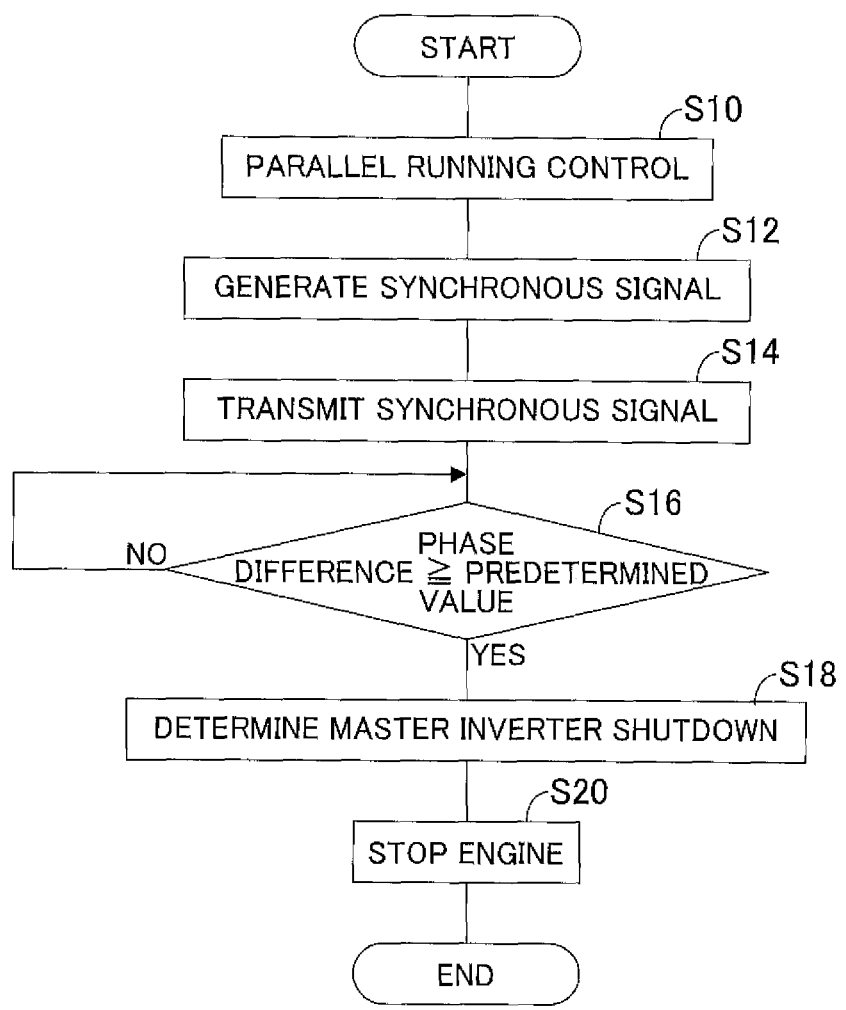
FIG. 14 is a flowchart showing an operation of a controller during a parallel running operation of the two inverter generators shown in FIG. 12.

FIG. 14 is a flowchart for explaining the operation of the CPUs 22a2, 22b2, 22c2 (first, second and third controllers) of the slave generator 10A during the parallel running operation of the two inverter generators according to this embodiment. The illustrated program is executed at predetermined intervals, for example 10 milliseconds when the generator 10A to be run in parallel is started.

The problems to be solved by the embodiments of this invention will be explained again. In the conventional parallel running control apparatus for single-phase two-wire inverter generators, if one of the generators is stopped during the parallel running operation, since the output from the generator is single-phase, it does not cause a phase fluctuation having a negative influence upon a load. However, in a parallel running control apparatus for three-phase inverter generators, since each phase of the power output from the generators to the load is offset by 120 degrees, if a reference generator is stopped during the parallel running operation, it increases the probability to cause a phase fluctuation of the power output, and sometimes makes difficult to supply power to the load sufficiently.

An object of the first embodiment of this invention is therefore to solve the aforementioned problem and to provide a parallel running control apparatus for inverter generators that can run a plurality of three-phase AC inverter generators 10A in parallel, and while immediately determining whether the master (reference) generator 10B was stopped by any disturbance to promptly stop the operation of the generators 10A so as to prevent the load from suffering an adverse influence therefrom.

The program begins at S (Step; Processing step) 10, in which the abovementioned parallel running control is executed with the master generator 10B. More specifically, based on the zero-cross timing, voltage, and current of the output from the generator 10B obtained based on the output of the interphase voltage/current sensors 22a3, 22b3, 22c3, the CPUs 22a2, 22b2, 22c2 control turning ON/OFF of the switching elements of the own (subject) first, second and third inverters 22a, 22b, 22c separately to execute the synchronous operation control, so that the single-phase AC outputs from the inverters 22a, 22b, 22c are synchronized with the detected single-phase AC outputs from the corresponding inverters 22a, 22b, 22c of the generator 10B in terms of the phase and voltage.

Figure 15A:
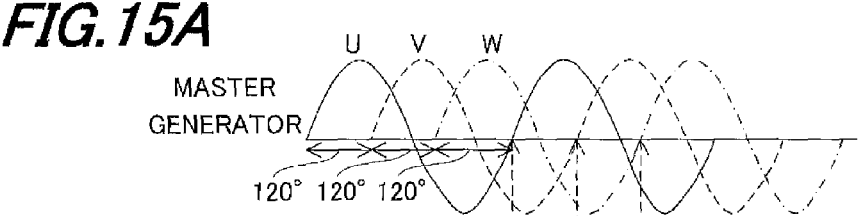
FIGS. 15A-15B are time charts showing output waveforms of generators A and B for explaining processing of the FIG. 14 flowchart during the parallel running operation of the two inverter generators shown in FIG. 12.
Figure 15B:
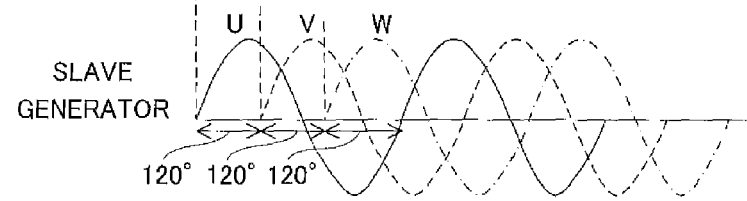

FIGS. 15A-15B and FIGS. 16A-16C are time charts showing output waveforms of the generators 10A, 10B during the parallel running control. FIG. 15A shows the output waveforms of the master generator 10B, and FIG. 15B shows the output waveforms of the slave generator 10A to be run in parallel.

As illustrated, when the generator (mater generator) 10B starts the operation, the CPUs 22a2, 22b2, 22c2 of the generator (slave generator) 10A detect the zero-cross timings of the output phases from the generator 10B that are inputted into own (their) first, second and third inverters 22a, 22b, 22c through the connection cable 34, and synchronize the phases of the AC outputs from their first, second and third inverters 22a, 22b, 22c with the phases of the AC outputs from the corresponding first, second and third inverters 22a, 22b, 22c of the generator 10B, so that the parallel running operation is executed.

The program next proceeds to S12, in which the CPU 22a2 (first controller) of the generator 10A makes the AC output from the first inverter 22a (U-phase AC) as a reference to generate the synchronous signals so that each of the output phases from the second and third inverters 22b, 22c are offset by 120 degrees; and to S14, in which the generated synchronous signals are transmitted to the CPUs 22b2, 22c2 (second and third controllers).

The program next proceeds to S16, in which each of the second and third controllers 22b2, 22c2 of the generator 10A detects the zero-cross timings of the AC outputs from the second and third inverters 22b, 22c and determines whether the phase difference between the detected zero-cross timing and the corresponding synchronous signal transmitted from the first controller 22a in S14 is greater than or equal to the predetermined value. When the result is affirmative, the second or/and the third controller 22b2, 22c2 sends a signal to the first controller 22a2 to inform that the phase difference between the output phase and the synchronous signal is greater than or equal to the predetermined value.

In S16, when the first controller 22a2 of the generator 10A receives the signal from at least one of the second and third controllers 22b2, 22c2 informing that the phase difference between the output phase and the corresponding synchronous signal is greater than or equal to the predetermined value, the program proceeds to S18, in which it is determined that the master inverter 10B was stopped (shutdown).

Specifically, as illustrated in FIGS. 16A-16C, in the parallel running control for the inverter generators according to the first embodiment, since the CPU 22a2 (first controller) of the slave generator 10A does not operate the self-sustained running control unlike the CPU 22a2 of the master generator 10B, in a case where the master generator 10B stops generating power due to any reason, such as a malfunction or the like, the CPUs 22a2, 22b2, 22c2 (first, second and third controllers) of the slave generator 10A become unable to detect the AC output to be made as the reference for synchronization. Hence, as shown in FIG. 16C, it gradually creates the phase difference (lag) between the AC outputs from the first, second and third inverters 22a, 22b2, 22c2 of the generator 10A and the corresponding synchronous signals. Consequently, when the difference (lag) becomes greater than or equal to the predetermined value, it can be determined that the master generator 10B was stopped.

When it is determined that the master generator 10B was stopped in S18, the program proceeds to S20, in which the first controller 22a2 of the generator 10A communicates to the CPU 28c of the engine control section 28 to stop the engine 12, and terminates the illustrated processing.

It should be noted that since the processing in S16 is repeated until the result becomes affirmative, once the phase difference of the AC output from the generator 10A becomes greater than or equal to the predetermined value so that it can be determined that the generator 10B was stopped, in other words, if the generator 10B is stopped and the phase difference grows to be unable to supply power to the load 32 sufficiently, it can promptly stop the engine 12.

As mentioned above, in the first embodiment, it is configured to have a parallel running control apparatus for an inverter generator A (10A) having first, second and third windings (18a, 18b, 18c) wound around an alternator (alternator section) 16 driven by an engine (12), first, second and third inverters (22a, 22b, 22c) each connected to the first, second and third windings to convert alternating current outputted from the first, second and third windings into direct and alternating current through switching elements (SCRs in a hybrid bridge circuits 22a11, 22b11, 22c11, FETs in H bridge circuits 22a12, 22b12, 22c12) to output the converted alternating current, first, second and third controllers (CPUs 22a2, 22b2, 22c2) each adapted to control turning ON/OFF of the switching elements of the corresponding first, second and third inverters and connected to enable to be communicated with each other, and an output terminal (26e) connected to terminal groups (26a, 26b, 26c) connected to the first, second and third inverters to output the converted alternating current as one of a U-phase, V-phase, and W-phase outputs and connected to a neutral terminal of the terminal groups; wherein the improvement comprises: the inverter generator A (10A) is adapted to run in parallel with at least one inverter generator B (10B), which is configured to be same as the inverter generator A, to output a three-phase alternating current, each of the first, second and third controllers has a voltage/phase detector (22a3, 22b3, 22c3) that detects voltage and phase of the converted alternating current inputted into the corresponding first, second and third inverters from the generator B, and when U-phase, V-phase and W-phase terminals of the output terminal are connected to the corresponding U-phase, V-phase and W-phase terminals of the generator B via a connection cable (34), controls turning ON/OFF of the switching elements of the first, second and third inverters such that the outputs from the first, second and third inverters are synchronized with the detected voltage and phase (S10), and the first controller (CPU 22a2) determines that the generator B was stopped when at least one of phase differences between the converted alternating current output from the first inverter and the converted alternating current output from the second and third inverters becomes greater than or equal to a predetermined value (S12 to S18).

With this, without controlling the output phases from the slave generator A to be run in parallel, it becomes possible to run the generators in parallel by synchronizing the AC outputs from own (subject) generator (generator A) with the AC outputs from the generator B in terms of the phase and voltage. As a result, it enables to run the three-phase AC inverter generators in parallel and to immediately determine whether the generator B to be run in parallel was stopped by any disturbance.

Further, the first embodiment is configured so that the first controller (CPU 22a2) generates a synchronous signal having a predetermined phase difference from the converted alternating current output from the first inverter (S12) and sends the synchronous signal to the second and third controllers (S14), such that the first controller determines that the generator B was stopped when the phase difference between the synchronous signal and the converted alternating current output from at least one of the second and third inverters becomes greater than or equal to the predetermined value (S16, S18). With this, it becomes possible to accurately determine whether the generator B run in parallel was stopped by any external disturbance.

Further, since the first controller (CPU 22*a*2) stops the engine (12) of the generator A (10A) when it is determined that the generator B (10B) was stopped, in addition to the above effects, when it is determined that the generator B was stopped during the parallel running operation, it can promptly stop generating power from the own (subject) generator (generator A) to be run in parallel.

Further, since the voltage/phase detector (22*a*3, 22*b*3, 22*c*3) detects a zero-cross timing of the alternating current inputted into each of the first, second and third inverters from the generator B (10B), and the first controller generates the synchronous signal based on the detected zero-cross timing, in addition to the above effects, it becomes possible to reliably operate a phase-synchronous control with the AC outputs from the reference generator B so that the inverter generators can be run in parallel.

The parallel running control apparatus for inverter generators according to a second embodiment of this invention will now be explained.

Figure 17:
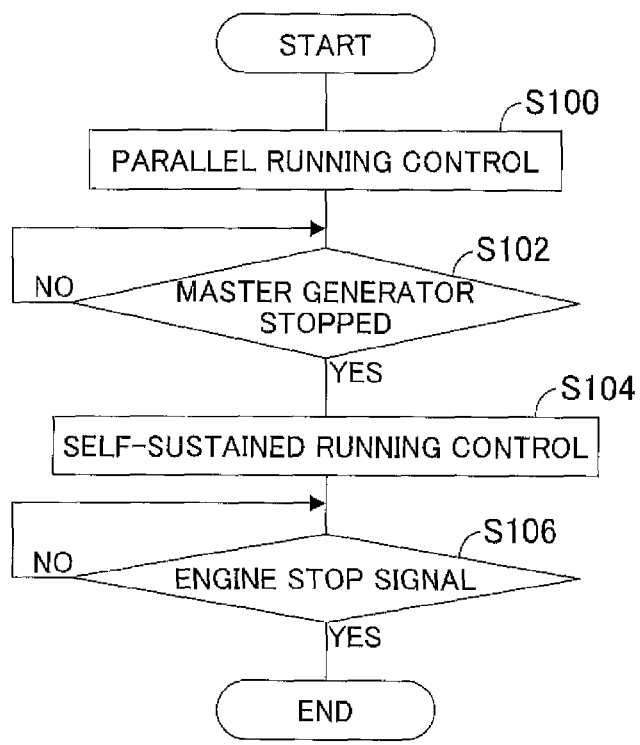
FIG. 17 is a flowchart showing an operation of a controller during a parallel running operation of inverter generators according to a second embodiment of the invention.

FIG. 17 is a flowchart explaining an operation of CPUs 22*a*2, 22*b*2, 22*c*2 (first, second, third controllers), especially the CPU 22*a*2 of the slave generator 10A during a parallel running operation of two inverter generators according to the second embodiment of this invention.

In this embodiment, when a phase difference between the AC output from own (subject) second inverter 22*b* or own third inverter 22*c* and a corresponding synchronous signal becomes greater than or equal to the predetermined value (FIG. 14, S18), the first controller 22*a*2 of the generator 10A is configured to execute the self-sustained running control by communicating to the second and third controllers 22*b*2, 22*c*2.

Similar to the processing from S10 to S18 in FIG. 14 of the first embodiment, the program begins at S100, in which the parallel running operation with the generator 10B is started, and proceeds to S102, in which it is determined whether at least one of the phase differences (lags) between the zero-cross timings of the AC output from the second and third inverters 22*b*, 22*c* and the corresponding synchronous signals is greater than or equal to the predetermined value, i.e., determined whether the master generator 10B was stopped during the parallel running control.

When the result in S102 is affirmative, the program proceeds to S104, in which the parallel running control is terminated and the self-sustained running control is started in accordance with the synchronous signals transmitted to the second and third controllers 22*b*2, 22*c*2 from the first controller 22*a*2.

Specifically, the first controller 22*a*2 controls turning ON/OFF of the switching elements to synchronize the zero-cross timings of V-phase and W-phase AC outputted from the own second and third inverters 22*b*, 22*c* with the generated corresponding synchronous signals to maintain the predetermined phase differences (120 degrees, 240 degrees) from a reference U-phase AC outputted from the first inverter 22*a*. In other words, the first controller 22*a*2 of the slave generator 10A switches the control from the parallel running control to the self-sustained running control which was executed by the first controller 22*a*2 of the master generator 10B during the parallel running operation.

As described above, after the master generator 10B was stopped, since there is no reference to be outputted from the master generator 10B, the first, second and third controllers (CPUs 22*a*2, 22*b*2, 22*c*) of the slave generator 10A are unable to maintain a normal parallel running control. However, in the second embodiment of the invention, when it is determined that the master generator 10B was stopped, it is adapted to terminate the parallel running control and start the self-sustained running control for a single generator. As a result, the power supply to the electric load 32 can be continued by generating power from the own (subject) generator 10A.

The program next proceeds to S106, in which the self-sustained running control is repeatedly continued until a stop signal for the engine 12 is detected.

Figure 18:
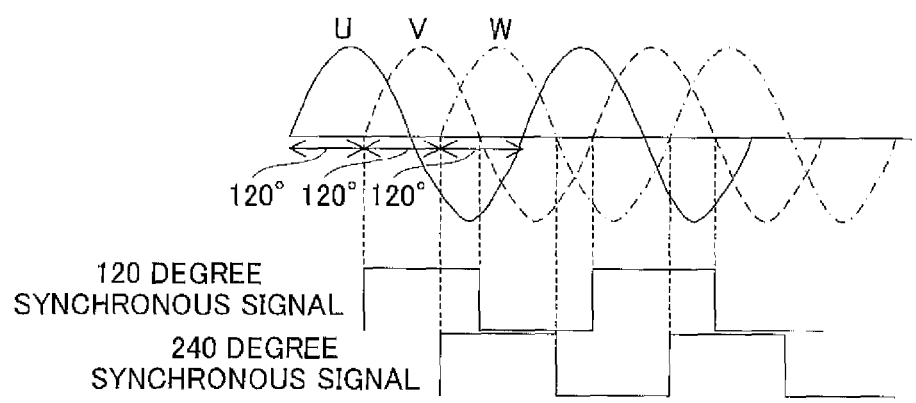
FIG. 18 is a time chart showing output waveforms of generators A and B for explaining processing of the FIG. 17 flowchart.

FIG. 18 is a time chart showing output waveforms of the generators 10A, 10B for explaining the processing of the FIG. 17 flowchart, specifically the processing of the self-sustained running control after determining that the master generator 10B was stopped.

As shown in FIG. 18, when the master generator 10B was stopped, the first controller 22*a*2 of the generator 10A communicates to the second and third controllers 22*b*2, 22*c*2 to control them and synchronize the zero-cross timings of the V and W-phase AC outputted from the second and third inverters 22*b*, 22*c* with the corresponding synchronous signals which have 120 degree or 240 degree phase difference from the reference U-phase AC outputted from the first inverter 22*a*.

In other aspects, since the configurations and effects are the same as those of the apparatus according to the first embodiment, the explanation thereof will be omitted.

As stated above, the first and second embodiments are configured to have a parallel running control apparatus for an inverter generator A (10A) having first, second and third windings (output windings 18*a*, 18*b*, 18*c*) wound around an alternator (alternator section) 16 driven by an engine (12), first, second and third inverters (22*a*, 22*b*, 22*c*) each connected to the first, second and third windings to convert alternating current outputted from the first, second and third windings into direct and alternating current through switching elements (SCRs in a hybrid bridge circuits 22*a*11, 22*b*11, 22*c*11, FETs in H bridge circuits 22*a*12, 22*b*12, 22*c*12) to output the converted alternating current, first, second and third controllers (CPUs 22*a*2, 22*b*2, 22*c*2) each adapted to control turning ON/OFF of the switching elements of the corresponding first, second and third inverters and connected to enable to be communicated with each other, and an output terminal (26*e*) connected to terminal groups (26*a*, 26*b*, 26*c*) connected to the first, second and third inverters to output the converted alternating current as one of a U-phase, V-phase, and W-phase outputs and connected to a neutral terminal of the terminal groups; wherein the improvement comprises: the inverter generator A (10A) is adapted to run in parallel with at least one inverter generator B (10B), which is configured to be same as the inverter generator A, to output a three-phase alternating current, each of the first, second and third controllers has a voltage/phase detector (22*a*3, 22*b*3, 22*c*3) that detects voltage and phase of the converted alternating current inputted into the corresponding first, second and third inverters from the generator B, and when U-phase, V-phase and W-phase terminals of the output terminal are connected to the corresponding U-phase, V-phase and W-phase terminals of the generator B via a connection cable (34), controls turning ON/OFF of the switching elements of the first, second and third inverters such that the outputs from the first, second and third inverters are synchronized with the detected voltage and phase (S10), and the first controller (CPU 22a2) determines that the generator B was stopped when at least one of phase differences between the converted alternating current output from the first inverter and the converted alternating current output from the second and third inverters becomes greater than or equal to a predetermined value (S12 to S18).

Further, in the embodiments, it is configured so that the first controller (CPU 22a2) generates a synchronous signal having a predetermined phase difference from the converted alternating current output from the first inverter (S12) and sends the synchronous signal to the second and third controllers (S14), such that the first controller determines that the generator B was stopped when the phase difference between the synchronous signal and the converted alternating current output from at least one of the second and third inverters becomes greater than or equal to the predetermined value (S16, S18).

Further, in the first embodiment, it is configured so that the first controller (22a2) stops the engine (12) of the generator A (10A) when it is determined that the generator B (10B) was stopped.

Further, in the second embodiment, it is configured so that the first controller (CPU 22a2) controls the second and third controllers to synchronize the alternating current outputs from the second and third inverters with the synchronous signal when it is determined that the generator B was stopped, such that the operation of the generator A is maintained (S102 to S104).

Further, it is configured so that the voltage/phase detector (22a3, 22b3, 22c3) detects a zero-cross timing of the alternating current inputted into each of the first, second and third inverters from the generator B (10B), and the first controller (CPU 22a2) generates the synchronous signal based on the detected zero-cross timing.

It should be noted that, although the FETs are used as the switching elements of the inverter section 22, any other switching elements such as IGBTs (Insulated Gate Bipolar Transistors), etc. can be used.

It should also be noted that although the above explanation is made with only focus on the generator 10A, since the other generator 10B run in parallel is configured to be the same, even if the generators 10A and 10B are swapped, it brings the same effects.

It should also be noted that, in the foregoing embodiments, although a parallel running control apparatus for two generators 10A, 10B are explained as an example, the embodiments can be applied for any number of generators.

Japanese Patent Application No. 2011-110571 filed on May 17, 2011, is incorporated by reference herein in its entirety.

While the invention has thus been shown and described with reference to a specific embodiment, it should be noted that the invention is in no way limited to the details of the described arrangements; changes and modifications may be made without departing from the scope of the appended claims.

What is claimed is:

1. A parallel running control apparatus for an inverter generator A having first, second and third windings wound around an alternator driven by an engine, first, second and third inverters each connected to the first, second and third windings to convert alternating current outputted from the first, second and third windings into direct and alternating current through switching elements to output the converted alternating current, first, second and third controllers each adapted to control turning ON/OFF of the switching elements of the corresponding first, second and third inverters and connected to enable to be communicated with each other, and an output terminal connected to terminal groups connected to the first, second and third inverters to output the converted alternating current as one of a U-phase, V-phase, and W-phase outputs and connected to a neutral terminal of the terminal groups;

wherein the inverter generator A is adapted to run in parallel with at least one inverter generator B, which is configured to be same as the inverter generator A, to output a three-phase alternating current;

each of the first, second and third controllers has a voltage/phase detector that detects voltage and phase of the converted alternating current inputted into the corresponding first, second and third inverters from the generator B, and when U-phase, V-phase and W-phase terminals of the output terminal are connected to the corresponding U-phase, V-phase and W-phase terminals of the generator B via a connection cable, controls turning ON/OFF of the switching elements of the first, second and third inverters such that the outputs from the first, second and third inverters are synchronized with the detected voltage and phase; and the first controller determines that the generator B was stopped when at least one of phase differences between the converted alternating current output from the first inverter and the converted alternating current output from the second and third inverters becomes greater than or equal to a predetermined value.

2. The apparatus according to claim 1, wherein the first controller generates a synchronous signal having a predetermined phase difference from the converted alternating current output from the first inverter and sends the synchronous signal to the second and third controllers, such that the first controller determines that the generator B was stopped when the phase difference between the synchronous signal and the converted alternating current output from at least one of the second and third inverters becomes greater than or equal to the predetermined value.

3. The apparatus according to claim 2, wherein the first controller stops the engine of the generator A when it is determined that the generator B was stopped.

4. The apparatus according to claim 2, wherein the first controller controls the second and third controllers to synchronize the alternating current outputs from the second and third inverters with the synchronous signal when it is determined that the generator B was stopped, such that the operation of the generator A is maintained.

5. The apparatus according to claim 2, wherein the voltage/phase detector detects a zero-cross timing of the alternating current inputted into each of the first, second and third inverters from the generator B; and the first controller generates the synchronous signal based on the detected zero-cross timing.

6. A method for controlling a parallel running operation for inverter generator A having first, second and third windings wound around an alternator driven by an engine, first, second and third inverters each connected to the first, second and third windings to convert alternating current outputted from the first, second and third windings into direct and alternating current through switching elements to output the converted alternating current, first, second and third controllers each adapted to control turning ON/OFF of the switching elements of the corresponding first, second and third inverters and connected to enable to be communicated with each other, an output terminal connected to terminal groups connected to the first, second and third inverters to output the converted alternating current as one of a U-phase, V-phase, and W-phase outputs and connected to a neutral terminal of the terminal groups, and a voltage/phase detector that detects voltage and phase of the converted alternating currents inputted into the first, second and third inverters from a generator B, which is configured to be same as the generator A, and adapted to run in parallel with the generator B, to output a three-phase alternating current, the method comprising the steps of:

controlling turning ON/OFF of the switching elements of the first, second and third inverters such that the outputs from the first, second and third inverters are synchronized with the detected voltage and phase when U-phase, V-phase and W-phase terminals of the output terminal are connected to the corresponding U-phase, V-phase and W-phase terminals of the generator B via a connection cable; and determining that the generator B was stopped when at least one of phase difference between the converted alternating current output from the first inverter and the converted alternating current output from the second and third inverters becomes greater than or equal to a predetermined value.

7. The method according to claim 6, further comprising the steps of:

generating a synchronous signal having a predetermined phase difference from the converted alternating current output from the first inverter; and sending the synchronous signal to the second and third controllers, wherein the step of determining determines that the generator B was stopped when the phase difference between the synchronous signal and the converted alternating current output from at least one of the second and third inverters becomes greater than or equal to the predetermined value.

8. The method according to claim 7, further comprising the step of:

stopping the engine of the generator A when it is determined that the generator B was stopped.

9. The method according to claim 7, wherein the step of controlling controls the second and third controllers to synchronize the alternating current outputs from the second and third inverters with the synchronous signal when it is determined that the generator B was stopped, such that the operation of the generator A is maintained.

10. The method according to claim 7, further comprising the step of:

detecting a zero-cross timing of the alternating current inputted into each of the first, second and third inverters from the generator B, wherein the step of generating generates the synchronous signal based on the detected zero-cross timing.

* * * * *